(12) United States Patent
Carter (10) Patent No.: US 7,571,886 B2
(45) Date of Patent: Aug. 11, 2009

(54) BELLCRANK SEAT SUSPENSION APPARATUS

(75) Inventor: John W. Carter, 147 Dalefield Loop, Fairfield Glade, Cumberland County, TN (US) 38558

(73) Assignee: John W. Carter, Fairfield Glade, TN (US)

(*) Notice: Subject to any disclaimer, the term of this patent is extended or adjusted under 35 U.S.C. 154(b) by 8 days.

(21) Appl. No.: 11/115,941

(22) Filed: Apr. 27, 2005

(65) Prior Publication Data

US 2005/0242264 A1 Nov. 3, 2005

Related U.S. Application Data

(60) Provisional application No. 60/567,575, filed on May 3, 2004.

(51) Int. Cl.
*F16M 13/00* (2006.01)
*A47C 1/00* (2006.01)

(52) U.S. Cl. .................. 248/419; 248/584; 297/344.15

(58) Field of Classification Search ................ 248/419, 248/424, 429, 575, 576, 564, 588, 589, 584, 248/585, 587; 297/344.13, 344.14, 344.15, 297/344.16; 267/131
See application file for complete search history.

(56) References Cited

U.S. PATENT DOCUMENTS

| | | | |
|---|---|---|---|
| 4,241,894 A | 12/1980 | Okuyama | |
| 4,520,986 A | 6/1985 | Liljequist et al. | |
| 4,856,763 A * | 8/1989 | Brodersen et al. | 297/344.16 |
| 5,014,958 A | 5/1991 | Harney | |
| 5,014,960 A * | 5/1991 | Kimura | 248/419 |
| 5,222,709 A | 6/1993 | Culley, Jr. et al. | |
| 5,794,911 A * | 8/1998 | Hill | 248/588 |
| 5,938,164 A | 8/1999 | Kargol et al. | |
| 5,984,410 A * | 11/1999 | Brodersen | 297/339 |
| 6,264,158 B1 | 7/2001 | Downey et al. | |
| 6,520,474 B2 | 2/2003 | Yoshida et al. | |
| 6,695,275 B2 | 2/2004 | Schuler | |
| 6,755,469 B2 | 6/2004 | Akaike et al. | |
| 6,773,049 B2 | 8/2004 | Rupiper et al. | |
| 6,776,384 B2 * | 8/2004 | Igarashi | 248/421 |
| 6,830,297 B2 | 12/2004 | Gordon | |
| 6,851,753 B2 | 2/2005 | Akaike et al. | |
| 7,032,874 B2 * | 4/2006 | Meyers et al. | 248/575 |
| 2003/0201660 A1 | 10/2003 | Janscha et al. | |
| 2004/0144906 A1 | 7/2004 | Hill et al. | |
| 2005/0001133 A1 | 1/2005 | Bostrom et al. | |
| 2005/0006937 A1 | 1/2005 | Takata et al. | |
| 2005/0242264 A1 * | 11/2005 | John | 248/424 |

OTHER PUBLICATIONS

Two pages believed to be from Kubota Manual with exploded ordering parts sheet and unit drawing; date unknown; detail of bellcrank in Fig. 8 and operation in Specification.

* cited by examiner

Primary Examiner—Amy J. Sterling
Assistant Examiner—Tan Le (57) ABSTRACT

A suspension for a vehicle seat having four bellcranks which guide the seat substantially vertically, oscillate on a central pivot on elevated stationary pivots mounted on a lower frame, with upper arms of the bellcranks pivotally attached to a seat cushion upper frame and the lower arms indirectly attached to adjustable tension springs that are attached to the upper frame; the lower ends with substantial inward offsets so as to rotate downwardly toward the mounting deck of the vehicle while clearing the lower frame and adjustable sliders; the bellcranks being coupled longitudinally and laterally to stay in phase and keep the upper frame level.

9 Claims, 11 Drawing Sheets

BELLCRANK SEAT SUSPENSION APPARATUS

FIELD OF THE INVENTION

This application claims all rights, priority, and benefits of copending U.S. provisional patent application Ser. No. 60/567,575 filed May 3, 2004. This invention is directed to a seat suspension apparatus effective on rough riding vehicles to absorb high jolts with minimum fore/aft movement.

BACKGROUND OF THE INVENTION

Seat suspension mechanisms support a person sitting on the seat while providing maximum comfort. These mechanisms are designed to provide comfort to the occupant while minimizing and absorbing or dampening bumps and jolts due to uneven, rough or rugged terrain the vehicle encounters. Design criteria include seat vibration and frequency of the seat and suspension of the seat and the vehicle, space limitation under the seat and above the seat to overhead restraints, the type of terrain likely to be encountered, limits of seat travel up and down to absorb shocks during operation, components costs, durability, and the like. The design criteria are particularly critical and generally more complicated for off-road vehicles, such as tractors, lift-trucks, heavy equipment, earth moving vehicles, and the like. These off-road vehicles have either relatively heavy-duty or no shock absorbing suspensions between the wheels and the chassis that do not prevent jolts, bumps, vibrations, and shocks from reaching the driver. Thus for these vehicles the seat and seat suspension must safely dampen and absorb these transmitted jolts in a safe manner while providing comfort and reducing fatigue. Such prior art suspensions have not adequately provided horizontal stability to enable the driver to maintain control when encountering rough terrain. As an example, it is not safe for the driver to be thrown fore-and-aft as the seat moves up and down due to rough terrain.

Typical prior art suspension mechanisms are illustrated and described in U.S. Pat. No. 4,241,894 to Okuyama, FIGS. 3a, 3b, and /3c. Other prior art suspension mechanisms, as illustrated in FIG. 1c of Okuyama employ a parallelogram arrangement of bi-arm linkage with one pair of adjacent ends of the arms pivotally connected to a bracket extending downwardly from the cushion frame and the opposite ends of the arms pivotally connected to the deck frame of the vehicle, with all pivot connections in a single plane. Biasing springs connected to the cushion frame or to arms and to the deck provide a cushioning effect. These prior art figures and description from Okuyama are incorporated herein by reference thereto. Still other prior art suspension mechanisms employ a scissors arrangement of bi-arm linkage with one pair of adjacent ends of the arms pivotally connected to the cushion frame and the opposite ends of the arms pivotally connected to the deck frame of the vehicle. Again biasing springs provide a cushioning effect by dampening the jolting movement of vehicle caused by roadway undulations and bumps. An attempt is made to choose the spring characteristics to bias rather than match the amplitude and frequency of the road bumps, in an effort to smooth the ride to avoid a bouncing effect.

Figure 8:
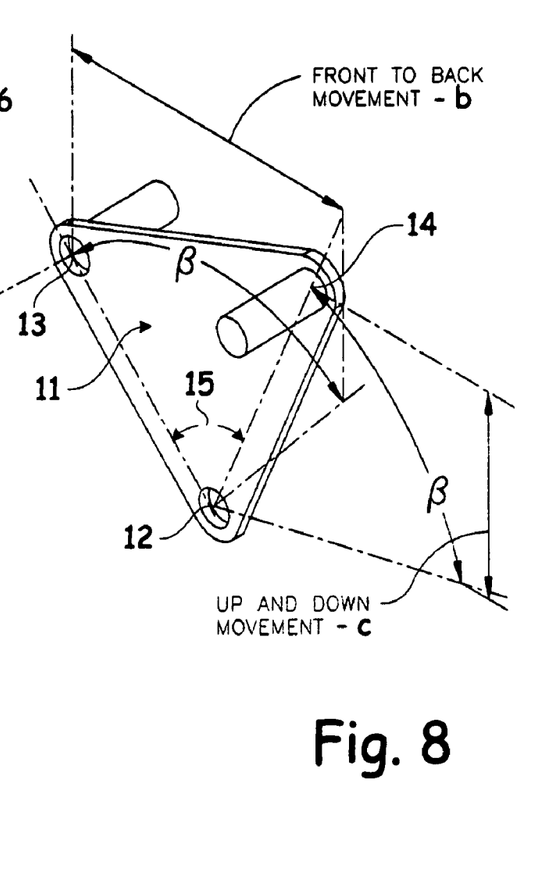
FIG. 8 is a perspective view of a typical bellcrank of the prior art.

Another typical prior art seat suspension apparatus in used on KUBOTA® vehicles includes four bellcranks connecting springs to bias movement of the seat frame. As illustrated in the schematic drawing of a side view of one of the bellcranks 11 of the KUBOTA® apparatus shown in FIG. 8, pivot point 12 is connected to and located down at the base, the angle 15 between lines from pivot point 12 to connecting point 13 to the seat frame and from point 12 to connecting point 14 to the spring bias opens upwardly, and the spring biasing connecting point 14 is on an upper directed arm form the pivot point. As the seat is lowered and raised bellcrank 11 rotates through angle β with up and down movement c of the seat frame due to the weight of the person sitting on the seat and jolts from a rough roadway, angle 15 moves counter-clockwise as the seat is compressed and unfavorably the seat also moves fore-and-aft distance b, which is common. The bellcranks of the Kubota apparatus pivot from a non-upraised pivot point on the base frame with the two arms of each of the bellcranks extending upwardly at an acute angle from each other. A spring bias pulls horizontally from a distal end of one of the ends against force applied to the distal end of the second upright arm in an opposite direction as the seat frame is depressed. No portion of this bellcrank moves into spaces between the slide rails below the lower frame or into the set cushion area and so has only about one-half as much vertical travel for similar profile height. All of these elements of these prior art bellcranks are essentially opposite or contrary to the present invention, resulting in, among other deficiencies, the substantial fore and aft movement during compression and decompression of the suspension mechanism as well as higher spring bias per distance of movement close to upper position and lower bias per distance of movement as the seat moves toward the lowest position, resulting in a harsher ride. Other limitations of these seat suspension mechanisms and the ones that follow include complexity, high weight, higher costs, and relatively high profile inasmuch as the height of the seat above the vehicle frame is almost always at a premium, either to provide space under the seat or due to restricted head room for safety of the operator. One of the reasons the prior art suspension mechanisms have a high profile is that they have separate upper and lower frames/brackets.

U.S. Pat. No. 5,014,960 to Kimura discloses a seat suspension mechanism directed to absorbing horizontal fore-and-aft impact or jolting applied to the seat. U.S. Pat. No. 4,520,986 to Liljequist et al disclosed a seat assembly with reduced elevational space requirements. U.S. Pat. No. 5,014,960 to Harney discloses a seat adjustor mechanism with bellcrank with angles between diverging lines from the pivot point to the two connecting points of the bellcranks greater than 90 degrees and a pivot point that is not raised above the seat frame. U.S. Pat. No. 5,222,709 to Culley, Jr. et al discloses a scissor-type suspension mechanism with a bellcrank used for adjustment. U.S. Pat. No. 6,264,158 to Downey et al discloses a support structure for a vehicle seat assembly with fore-aft adjustment. U.S. Pat. No. 6,520,474 to Toshida et al discloses a slice mechanism for a vehicle seat. U.S. Patent Application Publication 2003/0201660 to Janscha et al discloses a seat suspension mechanism with a bellcrank with angles between diverging lines from the pivot point to the two connecting points of the bellcranks greater than 90 degrees and a pivot point that is not raised to extend above the seat frame. U.S. Pat. No. 5,938,164 to Kargol et al discloses a seat adjuster for vehicle seat assemblies. U.S. Pat. No. 6,695,275 to Schuler et al discloses a device for longitudinal adjustment for vehicle seats. U.S. Patent Application Publication 2005/0006937 to Takata et al discloses a lifter for adjusting the height of a vehicle seat frame with a magnetic damper. U.S. Patent Application Publication 2005/0001133 to Bostrom et al discloses a scissor-type seat suspension mechanism for motor vehicles. U.S. Pat. No. 5,794,911 to Hill discloses a suspension seat using a parallelogram suspension mechanism. U.S. Patent Application Publication 2004/0144906 to Hill et al discloses a vehicle suspension mechanism with a bellcrank that operates differently and does not include the elements of the bellcranks of the present invention. U.S. Pat. No. 6,755,469 to Akaike et al discloses a typical parallelogram suspension mechanism. U.S. Pat. No. 6,851,753 to Akaike et al discloses a suspension system similar to his prior patent except for pivot members from the seat frame to a slide connection in the base frame. U.S. Pat. No. 6,830,297 to Gordon discloses a suspension seat with a link between the spring and the suspension mechanism similar to the prior art described above. U.S. Pat. No. 6,773,049 to Rupiper et al. discloses a suspension seat using a parallelogram suspension mechanism. U.S. Pat. No. 6,776,384 to Igarashi discloses a seat suspension using a typical scissor cross-member suspension mechanism.

None of these devices disclose or even suggest the use of the bellcranks and suspension apparatus of the present invention, nor do they satisfy the needs of the prior art described herein above or attain the objects of the present invention provided herein below.

SUMMARY OF INVENTION

Important elements of an embodiment of a vehicle seat suspension of this invention include a plurality of, preferably four in number, bellcranks, each pivotally connected at a proximate median point of the bellcrank, to a pivot member raised above and structurally connected to a base frame adapted to be attached on mounting deck of a vehicle at a pivot point which is elevated above said base frame to a height that is above a seat cushion frame when the seat cushion frame is lowered due to the weight of a person sitting on the cushion or to a jolt from the roadway. These elevated pivot points preferably require that that the pivot members be positioned laterally so as to not contact the seat cushion frame when cushion frame is lowered and each pivot member extends above the seat cushion frame, and also a hollow opened from below into the cushion for each pivot member be provided so that when the cushion frame is lowered and each pivot member extends above the seat cushion frame, the cushion will not engage the pivot member.

An embodiment of the invention is a seat suspension apparatus adapted to be attached to a mounting deck of a vehicle, said apparatus including a lower frame comprising a pair of longitudinal side members and four pivot members structurally attached and extending upwardly from the side members of the lower frame. The term "frame" is not limited as to shape and includes square rigid frames as pictured, but also other shapes. The term "longitudinal" is used to define relative directions and does not limit the length of the side members. These pivot members are generally referred to as providing elevated pivot points, centers, or connections for the median pivot connection of the bellcranks. The apparatus also includes four bellcrank members disposed to pivot or rotate in vertical planes, each bellcrank member including a median pivot section each pivotally connected to a distal end of the four pivot members an upper bellcrank arm comprising a distal end, and a lower bellcrank arm comprising a distal end. The apparatus further includes an upper seat cushion frame pivotally connected to the distal ends of the four upper bellcrank arms, and spring biasing means pivotally connected to the distal ends of the four lower bellcrank arms to provide spring biasing against downward movement of the seat cushion frame. When the upper seat cushion frame is depressed, the median pivot sections of the bellcrank members extend above an upper edge of the upper seat cushion frame and the distal ends of the lower bellcrank arms rotate to a height below a lower edge of the lower frame.

It is preferred that the distal ends of the lower bellcrank arms of the bellcranks be offset laterally inwardly. It is also preferred that the four bellcranks be physically coupled together maintaining them in a phase relationship to each other. It is further preferred that the spring biasing means pivotally connected to distal ends of the lower bellcrank arms include a pair of tension springs connected to the upper seat cushion frame, although connection to the lower frame operates well. It is also preferred that an angle between two diverging lines each from a central axis of a pivot connection on the median pivot section of the bellcrank to central axes of pivot connection points on the distal ends of the upper and lower arms be less than ninety degrees. It is more preferred that the angle between the two diverging lines be in the range of 30 to 90 degrees and most preferred in the range of 40 to 70 degrees. It is also preferred that the upper and lower arms of the bellcranks rotate through proximate equal angles relative to each other above and below a median position corresponding to median height position of the upper seat cushion frame. It is further preferred that apparatus further include an adjustment means to adjust the spring bias force. It is also preferred that the spring biasing means include a pair of springs each attached at one pair of ends to the distal ends of the lower bellcrank arms and that the apparatus further include adjustment means that includes connecting a second pair of ends of the springs to a screw shaft extending through an opening in the upper seat cushion frame and terminating in an adjustment knob to turn the shaft to adjust the spring bias. It is further preferred that apparatus further include a seat cushion attached on top of the seat cushion frame, the cushion including a hollow space above the frame to receive the median pivot sections of the bellcrank members upon downward movement of the seat cushion frame. It is also preferred that apparatus further include a seat cushion attached on top of the seat cushion frame wherein the seat cushion includes four cavities cut out from below to receive the median pivot sections of the bellcrank members upon downward movement of the seat cushion frame. It is further preferred that the apparatus further include spacer mounting means adapted to attach the lower frame to the mounting deck at a height above the mounting deck sufficient to allow the distal end of the lower arm of the bellcranks to clear the mounting deck when rotated fully downwardly. It is also preferred that apparatus further include a fore and aft slide means that includes laterally spaced longitudinal sliding rails adapted to be attached onto the mounting deck of a vehicle, said means to support the lower frame and allow said frame to slide longitudinally to a multiplicity of longitudinal positions.

A second embodiment of the invention is a seat suspension apparatus adapted to be attached to a mounting deck of a vehicle, said apparatus including a lower frame including longitudinal side members and spacer mounting means adapted to attach the lower frame to the mounting deck at a height above the mounting deck. The apparatus further includes four pivot members structurally attached to and extending upwardly from outer edges of the side members of the lower frame. The apparatus also includes four bellcrank members disposed to pivot in vertical planes, each bellcrank including a median pivot section pivotally connected to an outer surface of a distal end of the pivot members, an upper arm and a lower arm. The apparatus further includes an upper seat cushion frame pivotally connected to distal ends of the upper bellcrank arms, and spring biasing means pivotally connected to distal ends of the lower bellcrank arms to provide spring biasing against downward movement of the seat cushion frame. The height of the distal ends of the pivot members is sufficient that when the upper seat cushion frame is depressed, the median pivot sections of the bellcrank members extend above an upper edge of the upper seat cushion frame and the distal ends of the lower bellcrank arms rotate to a height below a lower edge of the lower frame. Further, the height of the lower frame above the mounting deck is sufficient to allow the distal ends of the lower arms of the bellcranks to clear the mounting deck when rotated fully downwardly. The above-preferred embodiments, where applicable, apply equally to this embodiment.

A third embodiment of this invention is a seat suspension apparatus adapted to be attached to a mounting deck of a vehicle, said apparatus including: a lower frame that includes a pair of longitudinal side members and four pivot members structurally attached and extending upwardly from the side members of the lower frame. The apparatus further includes four bellcrank members disposed to rotate in vertical planes, each bellcrank member including a median pivot section each pivotally connected to a distal end of the four pivot members an upper bellcrank arm including a distal end, and a lower bellcrank arm including a distal end offset laterally inwardly. The apparatus further includes an upper seat cushion frame pivotally connected to the distal ends of the four upper bellcrank arms, and spring biasing means pivotally connected to the distal ends of the four lower bellcrank arms to provide spring biasing against downward movement of the seat cushion frame. As the upper seat cushion frame is depressed, the median pivot sections of the bellcrank members extend above an upper edge of the upper seat cushion frame and the distal ends of the lower bellcrank arms are sufficiently offset to allow rotation to a height below a lower edge of the lower frame. The above-preferred embodiments, where applicable, apply equally to this embodiment.

Other important elements preferably include a plurality of bellcranks, each bellcrank with an angle less than ninety degrees between diverging lines from the pivot point to two separated connecting points, one point adapted to be pivotally connected to a biasing spring and the second point adapted to be pivotally connected to the seat cushion frame. It is most preferably in the range of 40 to 70 degrees. It is also preferred that the connecting point for the spring bias be on a downwardly extending arm from the pivot point. It is also preferred that the angle between the diverging lines from the pivot point to two separated connecting points of each bellcrank move pivot downwardly as the seat frame is lowered.

A fourth embodiment of this invention is a seat suspension apparatus comprising four offset bellcranks, each including an upper arm with a proximal end and a distal end and a lower arm with a proximal end and a distal end, wherein the proximal ends are structurally joined, a central pivot opening through the proximal ends, which are in a vertical first plane with the distal end of the upper arm, a first opening through the distal end of the upper arm adapted to be pivotally connected to a seat frame, a second opening through the distal end of the lower arm adapted to be pivotally connected to a spring biasing means, an offset extension of the lower arm extending from a median section proximately horizontally from the first plane to a distal section of the lower arm extending perpendicular therefrom in a second plane parallel to the first plane, and wherein a first line drawn through the center points of the central pivot opening and the first opening and a second line drawn on the first plane through the center point of the central pivot opening and the central axis of the second opening are at an angle of less than 90 degrees and greater than 30 degrees.

A fifth embodiment of this invention is a seat suspension apparatus including four offset bellcranks, each including: an upper arm with a proximal end and a distal end and a lower arm with a proximal end and a distal end, wherein the proximal ends are structurally joined, a central pivot opening through the proximal ends, which are in a vertical first plane with the distal end of the upper arm, a first opening through the distal end of the upper arm adapted to be pivotally connected to a seat frame, a second opening through the distal end of the lower arm adapted to be pivotally connected to a spring biasing means, an offset extension of the lower arm extending from a median section proximately horizontally from the first plane to a distal section of the lower arm extending perpendicular therefrom in a second plane parallel to the first plane, and wherein a first line drawn through the center points of the central pivot opening and the first opening and a second line drawn on the first plane through the center point of the central pivot opening and the central axis of the second opening are at an angle of less than 90 degrees and greater than 30 degrees.

It is an object of an embodiment of the present invention to provide a seat suspension apparatus for a vehicle that utilizes a low profile between the seat cushion and the mounting deck of the vehicle.

It is a further object of an embodiment of the present invention to provide a seat suspension apparatus for a vehicle that utilizes a low profile between the seat cushion and the mounting deck of the vehicle when it is not feasible to adjust pre-existing longitudinal fore and aft slide rails used to support the seat suspension apparatus and allow the apparatus to slide back and forth to a multiplicity of positions.

It is an additional object of an embodiment of the present invention to provide a seat suspension apparatus for a vehicle that utilizes a low profile between the seat cushion and the mounting deck of the vehicle when it is feasible to laterally adjust longitudinally aligned fore and aft slide rails used to support the seat suspension apparatus and allow the apparatus to slide back and forth to a multiplicity of positions.

It is a further object of an embodiment of the present invention to provide a seat suspension apparatus for a vehicle that dampens the jolts of a rough terrain and does not require inclusion of a standard dampening mechanism, such as a shock absorber.

It is an additional object of an embodiment of the present invention to provide a seat suspension apparatus for a vehicle wherein the stiffness of the spring bias against downward movement of the seat is reduced as the seat moves downward also reducing the strain on the spring attachments, and resulting in a softer, more comfortable ride.

It is an additional object of an embodiment of the present invention to provide a seat suspension apparatus for a vehicle wherein adjustment of the spring bias tension is handy and may be safely and easily reached by the driver while sitting on the seat.

It is a further object of an embodiment of the present invention to provide a seat suspension apparatus for a vehicle that utilizes a part of the seat, namely a standard seat frame, as part of the suspension apparatus to save parts and vertical space below the seat.

It is an additional object of an embodiment of the present invention to provide a seat suspension apparatus for a vehicle that utilizes a low profile between the seat cushion and the mounting deck of the vehicle without structural interference problems or sacrificing comfort of the driver sitting on the seat.

It is an object of an embodiment of the present invention to provide a seat suspension apparatus that allows minimal fore and aft movement as the seat frame moves up and down due to rough terrain.

DESCRIPTION OF PREFERRED EMBODIMENTS

Preloading the spring bias is to balance the weight of the particular operator so that he is statically positioned approximately at mid-height of the vertical travel limits of the seat suspension system.

Figure 1:
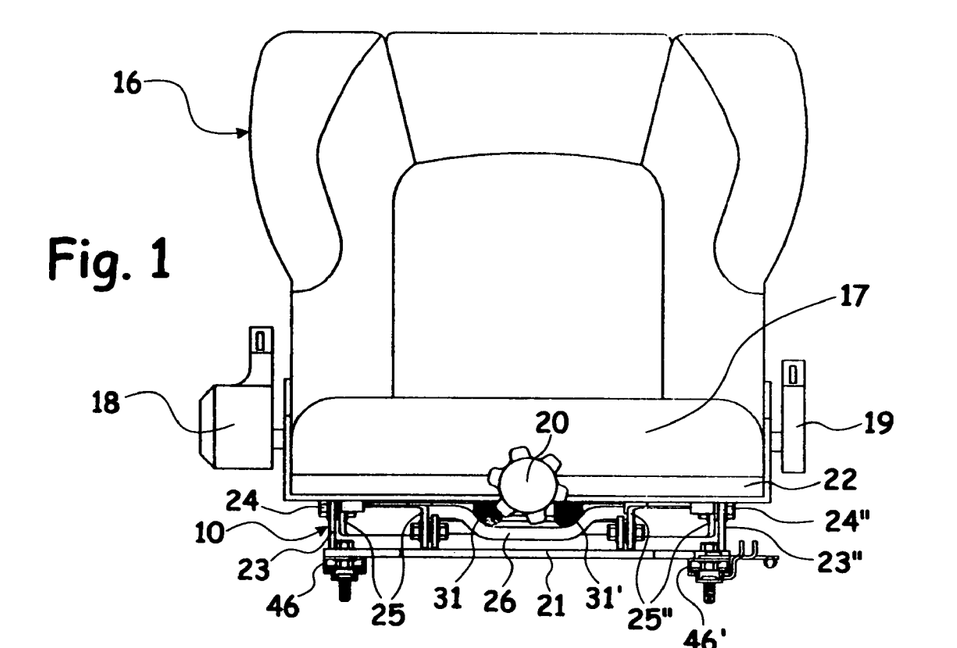
FIG. 1 is a front plan view of a vehicle seat with the suspension apparatus of the present invention supporting the seat.
Figure 2:
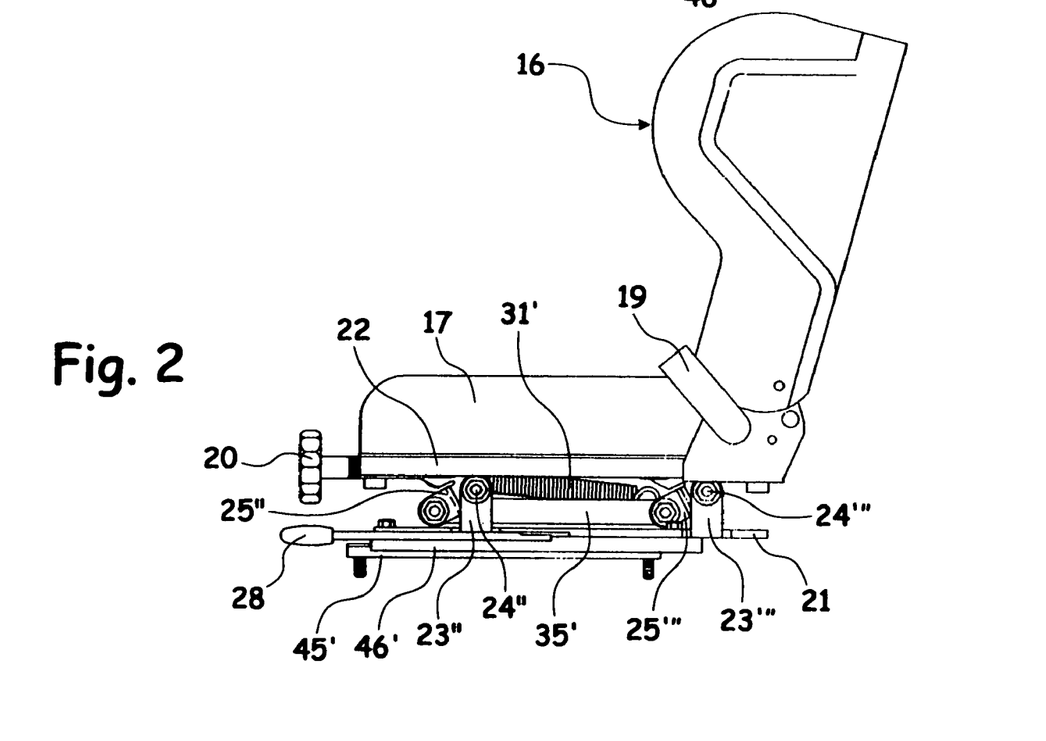
FIG. 2 is a left side elevational view of said vehicle seat with the apparatus.
Figure 3:
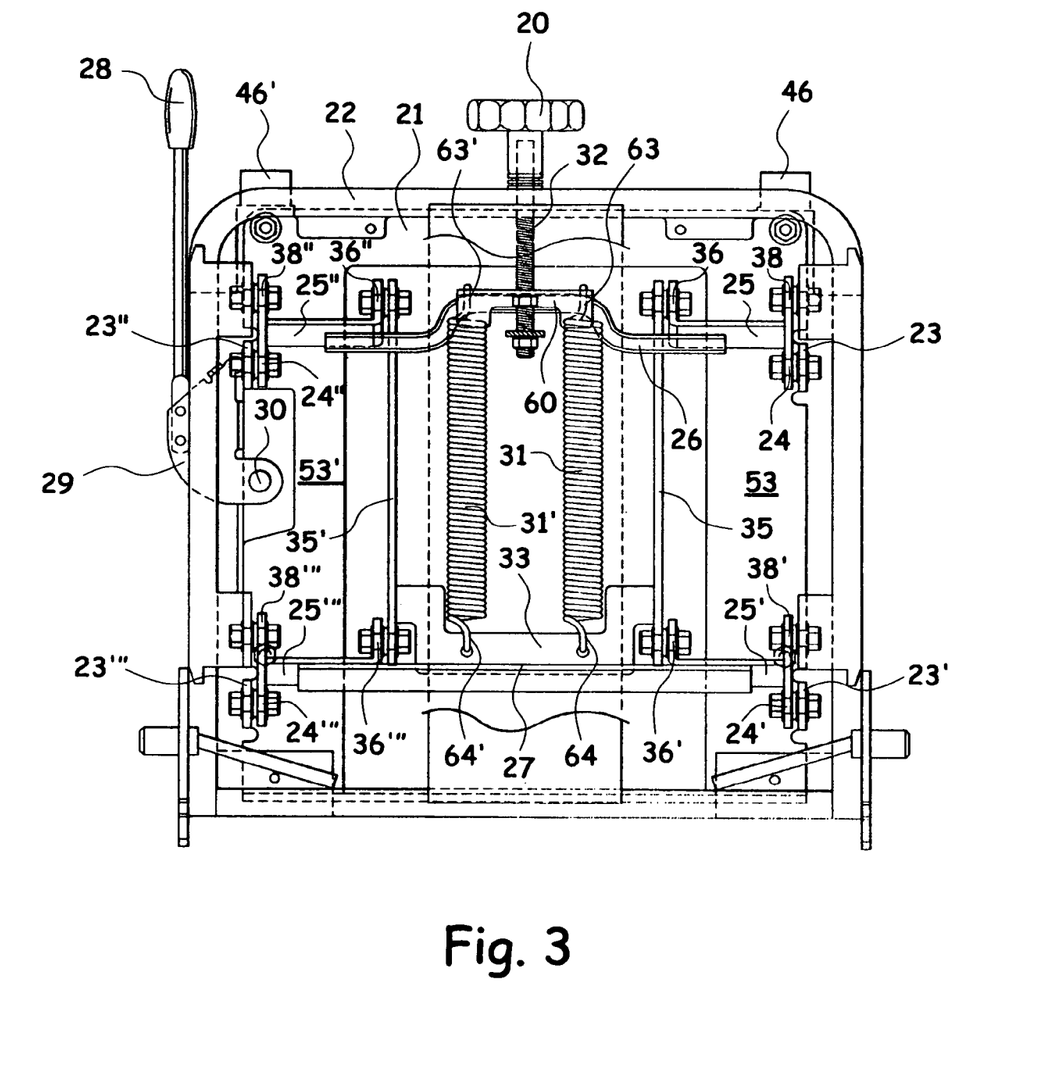
FIG. 3 is a top view of said apparatus with the seat removed.
Figure 4:
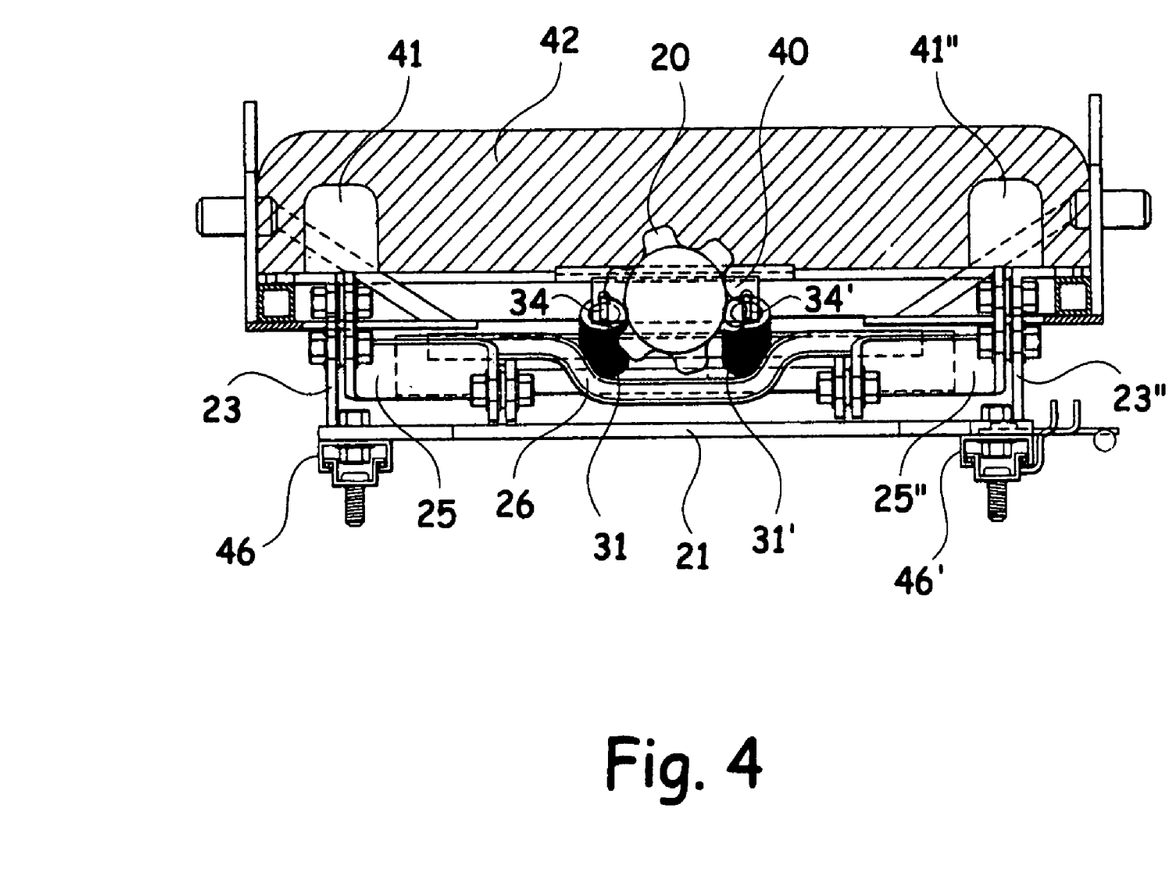
FIG. 4 is an enlarged front plan view of said apparatus with the seat cushion and sides of knob cut-away. (note to John: the seat cushion is cross-sectioned and some of the knob is missing)
Figure 5:
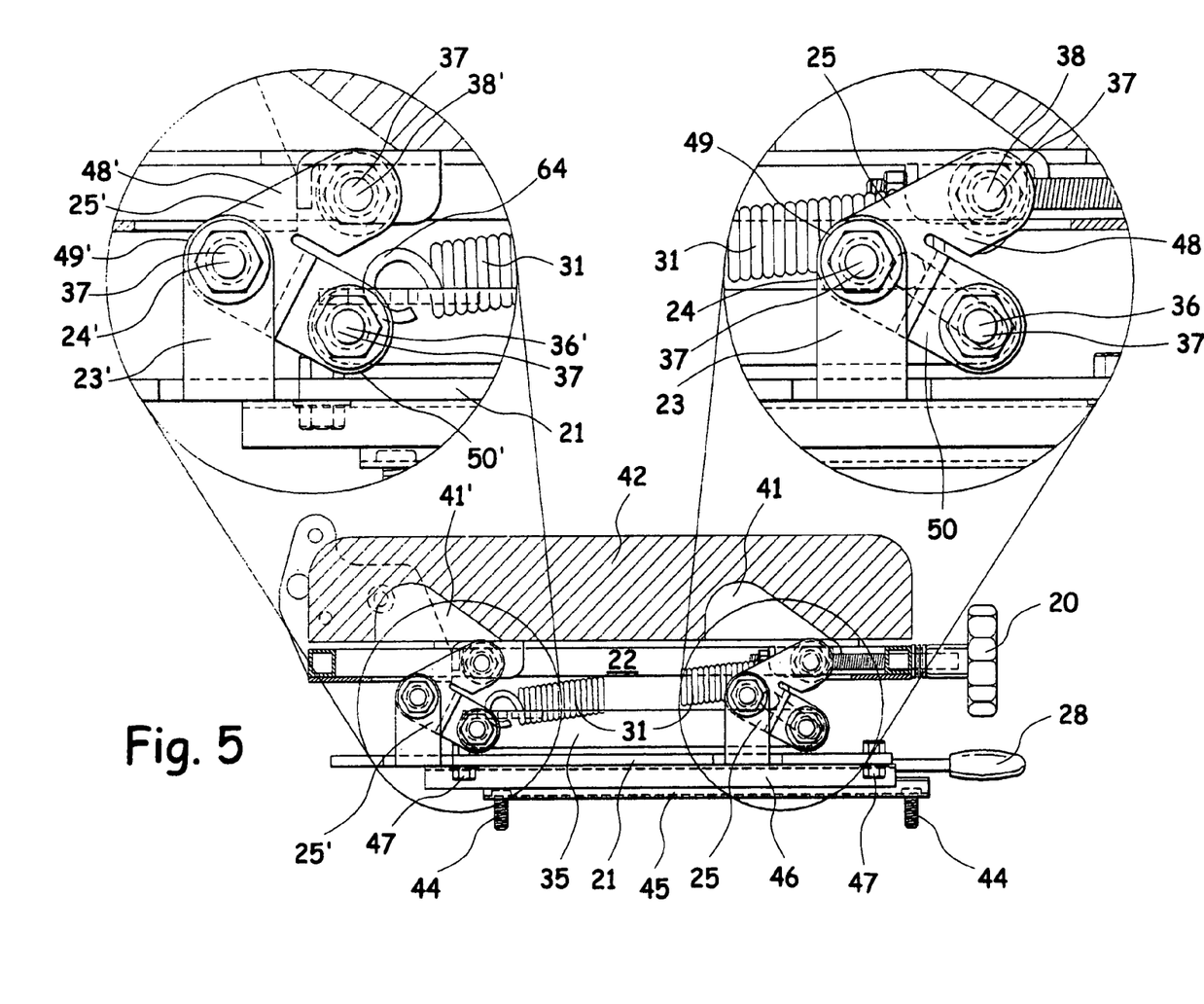
FIG. 5 is a right side plan view of said apparatus with the seat cushion in its uppermost position of travel and partially cut-away.
Figure 6:
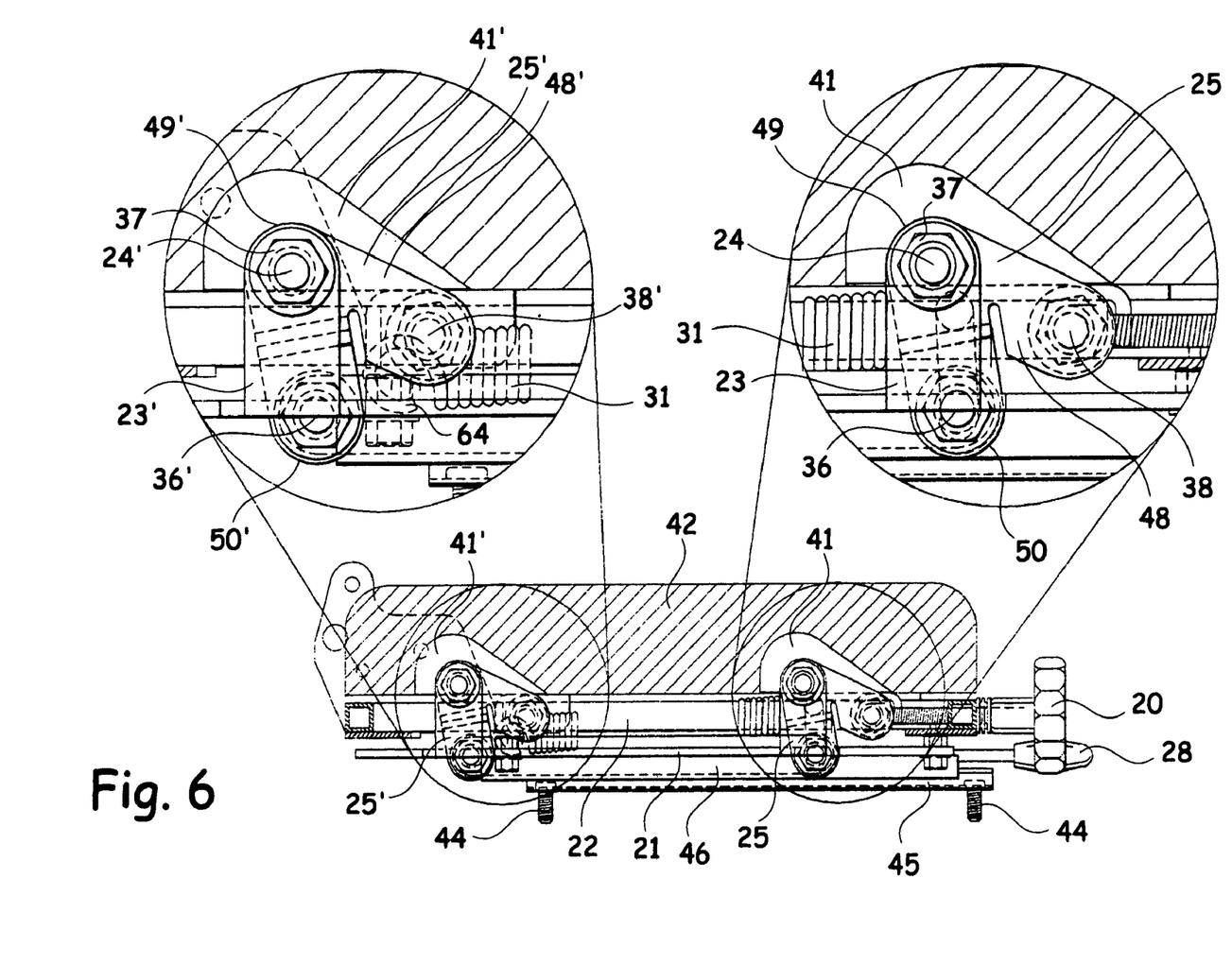
FIG. 6 is a right side plan view of said apparatus with the seat cushion in its almost lowermost position of travel and partially cut-away.
Figure 7A:
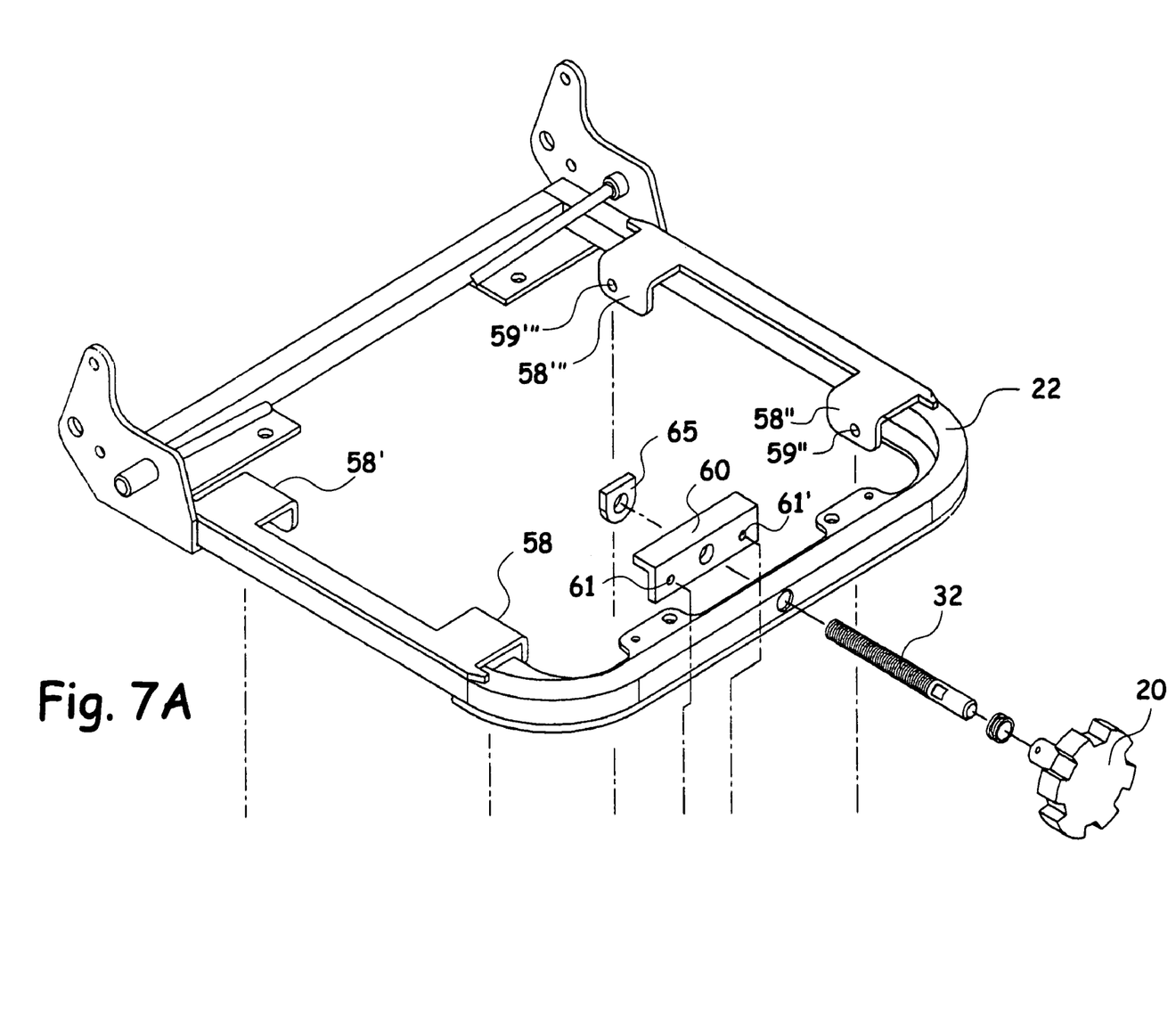
FIG. 7 is provided on four sheets, 7A, 7B, 7C, and 7D and is an exploded perspective view of said apparatus without seat cushions.
Figure 7B:
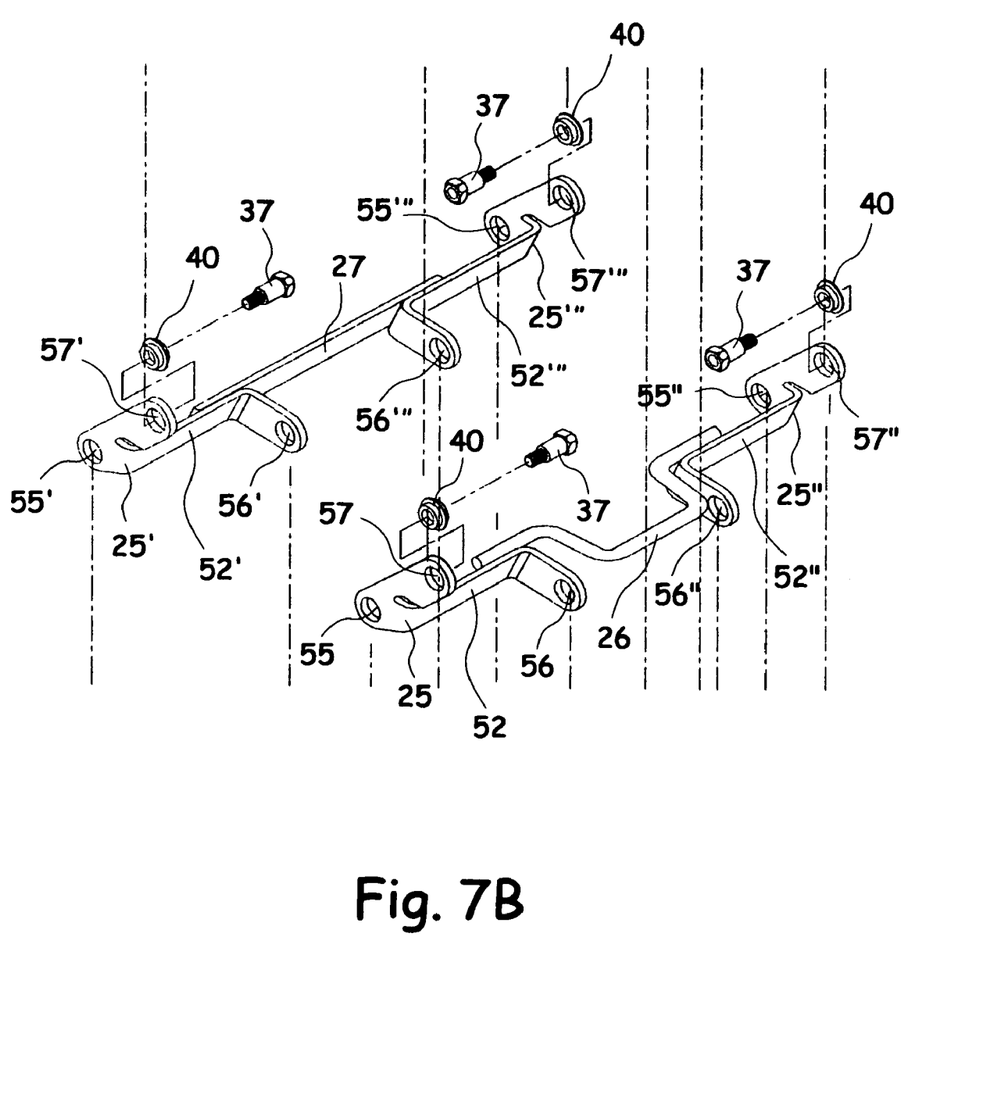
Figure 7C:
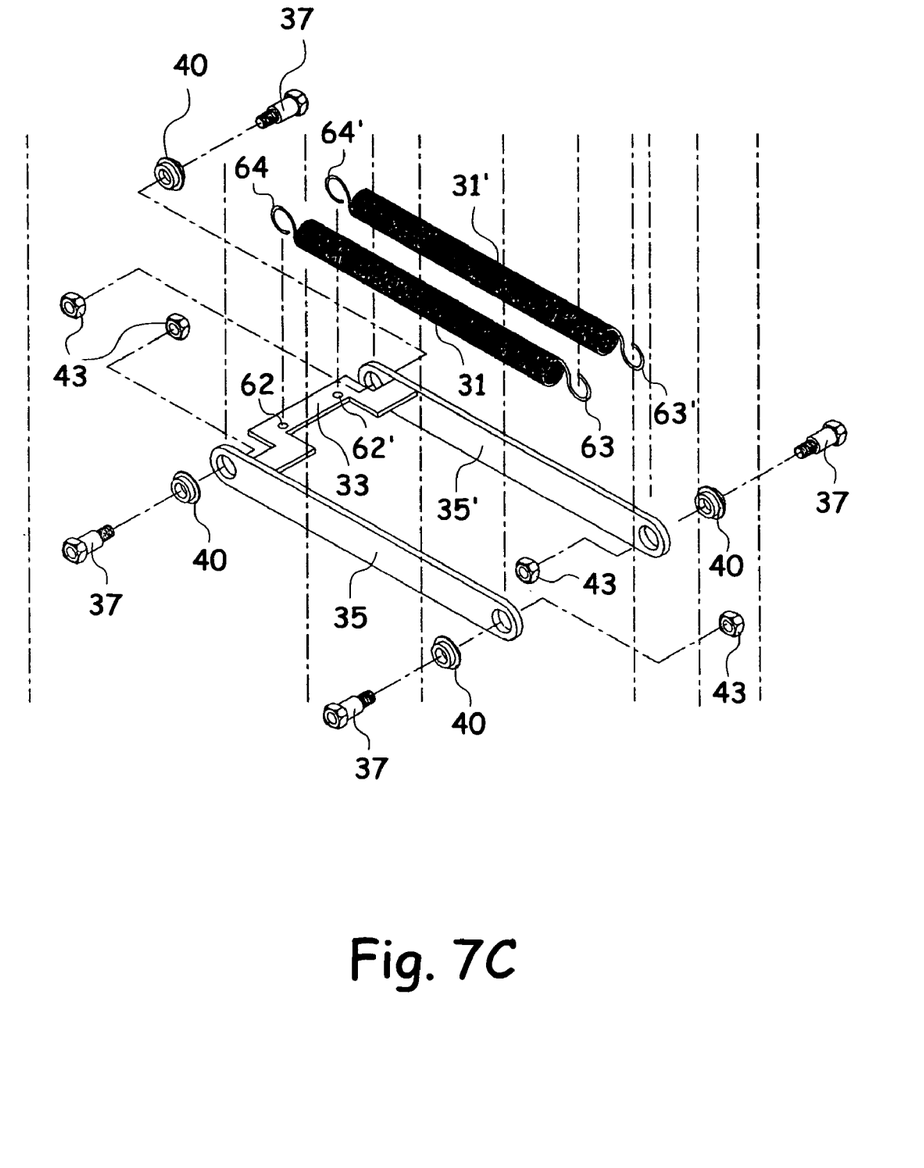
Figure 7D:
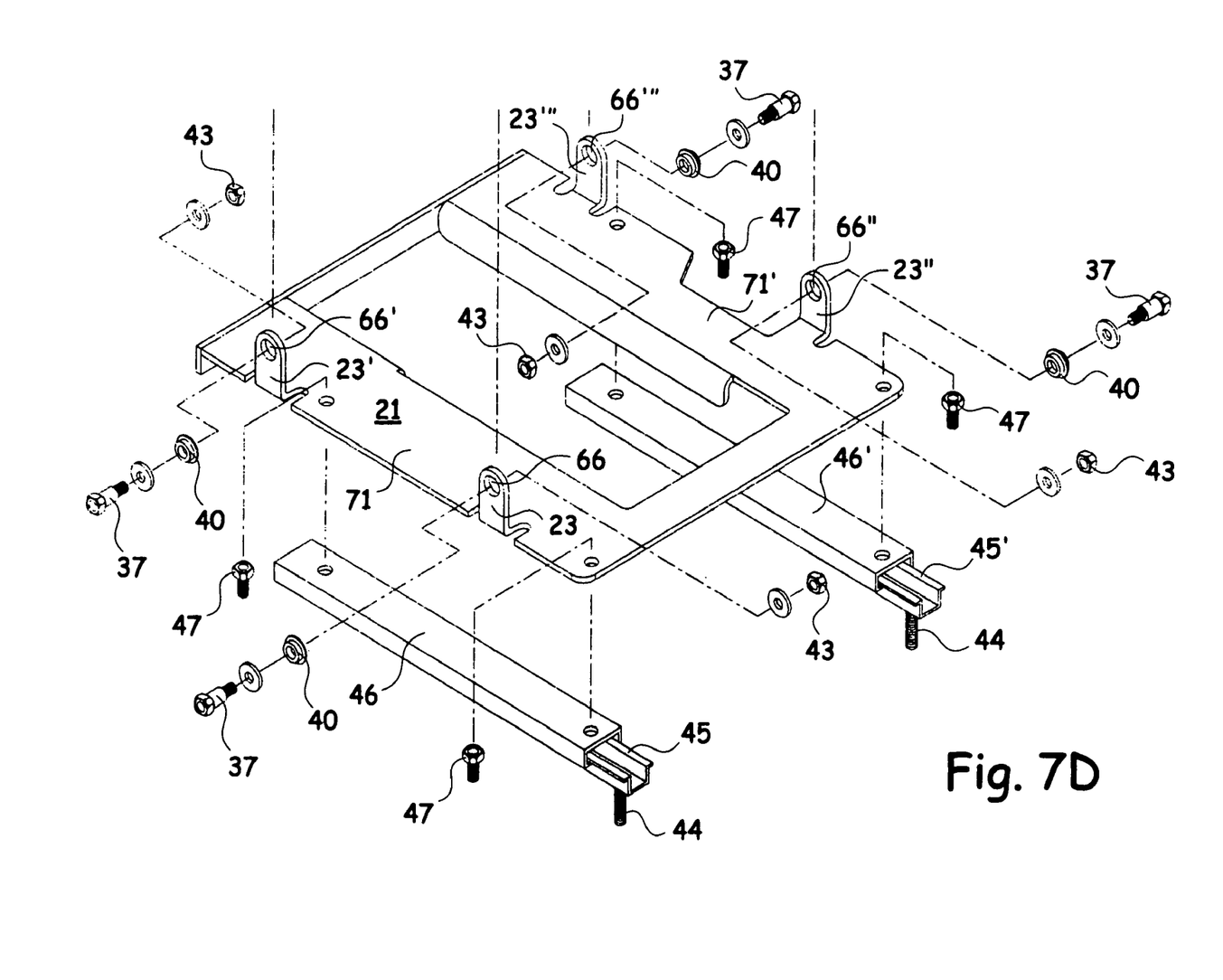
Figure 9:
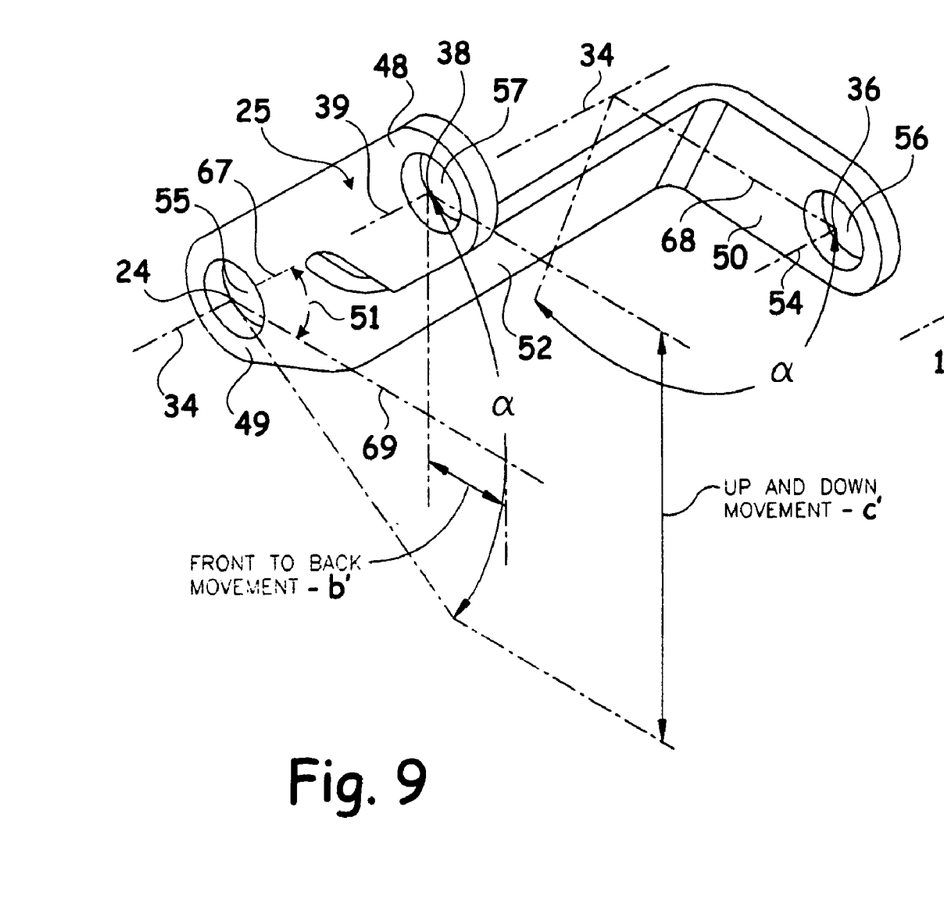
FIG. 9 is an enlarged perspective view of a preferred bellcrank of the present invention.
Figure 10:
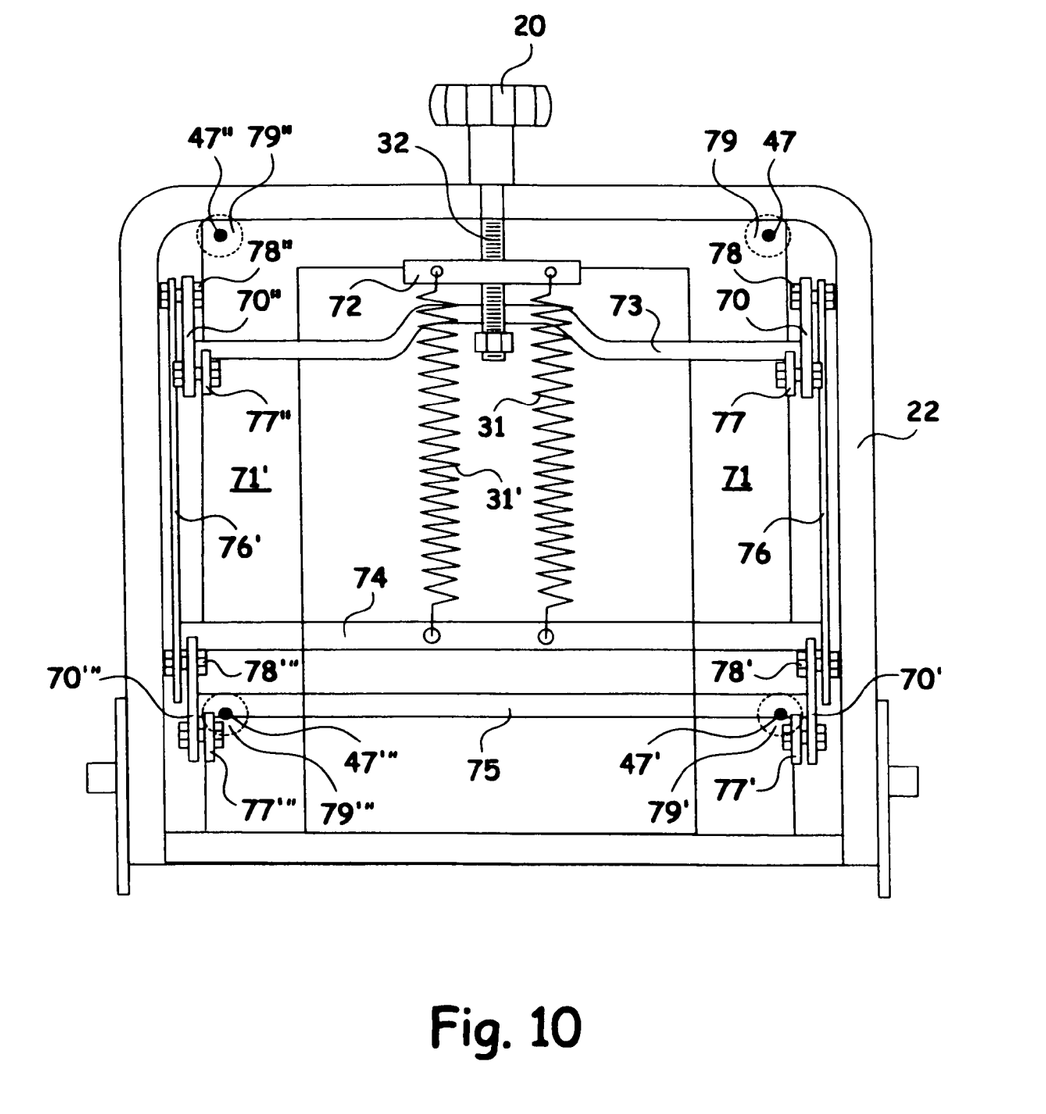
FIG. 10 is top view diagram of a second embodiment of a seat apparatus of the present invention without slide tracks.

Seat suspension apparatus 10 of the present invention uses seat frame 22 as the upper frame of the suspension apparatus providing a lower silhouette. As shown in FIGS. 1, 2, and later figures, seat back 16 including a hidden frame with foam and covering and seat cushion 17 including foam and covering are all securely attached to seat frame 22. Standard seat belt latch 19 and seat belt retractor 18 are securely attached to frame 22. The seat is adjustable and slides 46 and 46' slide frontwardly and rearwardly and locked in a chosen position using standard mechanisms with seat position release lever 28, which disengages seat position release latch 29 pivoting on release pivot connection 30 as shown on FIG. 3. Throughout the drawings, where there are two essentially identical parts or elements the right side part of the two is without a prime and the identical part on the left is affixed with a prime ('). Further, throughout the drawings, where there are four essentially identical parts or elements the right front side part of the four is without a prime and the identical part on the right rear is affixed with a prime ('). Continuing with the four essentially identical parts including right and left hand versions where applicable, the parts or elements the front left side of the four is affixed with a double prime (") and the identical part on the left rear is affixed with a triple prime ('''). As shown on FIGS. 1 through 3, four bellcranks, 25 (for the purpose of clarity and simplicity the remaining three essentially identical elements, including but not limited to the other bellcranks, 25', 25", and 25''', are not listed but are included by the reference to "four" parts). As the seat moves up and down the four bellcranks 25 pivot on four pivot centers 24, located on four vertical pivot posts 23, which are securely connected to and extend upwardly from two longitudinal side members 53 and 53' of base frame 21. All of the pivot connections of the four bell cranks 25, that is four pivotal connections to four bellcrank pivot centers 24, four pivotal connections to four spring bias connection centers 36, and four pivotal connections to four seat frame connection centers 38, utilize a total of twelve shoulder bolts 37 though the respective holes and secured with twelve nuts 43, with bushings 40 allowing the pivotal connections to freely pivot. Where the parts are not clearly shown on FIGS. 1 through 6, they are found on the exploded views of FIG. 7. For example the four bellcranks 25 pivotally connect through four seat frame connection central axes 38 to seat frame 22 through horizontal holes 59 in four vertical flanges 58 depending downwardly from frame 22. While two tension support springs 31 and 31' pull on four pivotal connections 36 on four lower end sections 50 of the four bellcranks 25, the four pivotal connection central axes 38 on four upper end sections 48 of four bellcranks 25 push upward on four seat frame connection flanges 58 welded to seat frame 22. As shown in FIG. 6, the tension in springs 31 is increased and reduced by rotating weight adjustment knob 20 to adjust for the weight of the rider. The four bellcranks 25 are phased longitudinally by phase links 35 and 35' pivotally connected at the front ends to pivot connections 36 and 36" respectively and at the rear ends to pivot connections 36' and 36''' respectively thereby maintaining pivotal connections 38 at the same height. Similarly, as shown in FIG. 7B, rear bellcranks, 25' and 25''', are phased together by real lateral phase link connecting member 27 welded at its ends to bellcrank off-set sections 52' and 52''' and front bellcranks, 25 and 25", are phased together by front lateral phase link connecting member 26 welded to bellcrank off-set sections 52 and 52", to keep the four bell cranks 25 at the same angular relationship. These lateral and longitudinal phase links coordinate to always maintain a "level" seat frame 22 and seat 17. As shown in FIGS. 7A & C, front hook ends 63 and 63' of tension springs 31 and 31' respectively hook into holes 61 and 61' through spring connection flange 60 through which screw shaft 32 threadably extends horizontally through threaded nut 65 welded to flange 60 so that flange 60 moves forward or rearward as knob 20 is rotated. Rear hook ends 64 and 64' of springs 31 and 31' respectively hook into holes 62 and 62' through spring attachment cross-member 33, which is welded transversely between rear sections of longitudinal phase-link members 35 and 35'. Cross-member 33 moves fore/aft and up/down with seat 17 up/down motions, but it does not rotate which would cause extra, damaging stresses in the spring end hooks being frictionally urged to follow such rotation. As shown in FIG. 7D, base frame 21 may be of relatively thin gauge metal as it is supported and reinforced by upper fore/aft slides 46 and 46' threadably attached by bolts 47 through base frame 21, upper slides 46 and 46' having a box-shaped cross-section with a lengthwise lower slot to slideably receive lower fore/aft lower slides 45 and 45' respectively, which have a "U" cross-sectional shape with lengthwise outwardly extending flanges to engage the bottom lengthwise inward extending flanges of upper slides 46 and 46'. Lower fore/aft slides 45 and 45' are attached by bolts 44 though vertical holes in the bottom wall of the slides to mounting deck of the vehicle, not shown. Although not shown, bumpers to provide cushioning end points by meeting phase bars and the like. Of particular interest is FIG. 9 together with FIGS. 5 and 6 showing the elements of bellcrank 25, which is identical to rear right bellcrank 25' and is the mirror image of front left bellcrank 25" and rear left bellcrank 25'". Bellcrank 25 rotates on pivot connection 24 located on vertical post 23 extending upwardly from lower base frame 21. Bellcrank 25 rotates on pivot connection 24 around horizontal central axis 34 of horizontal hole 55 through the bellcrank located in median section 49 of the bellcrank. As seat frame 22 is lowered and raised bellcrank 25 rotates through angle α with up and down movement distance c' of the seat frame due to the weight of the person sitting on the seat and jolts from a rough roadway; and most favorably the seat only moves fore-and-aft a small distance b'. Force is applied to bellcrank 25 by the downward movement of upper seat frame 22 through the arc of angle α of connection 38 and countervailing force is applied by the spring bias through the arc of angle α of connection 36. For a suspension apparatus of the present invention a total movement up/down of about one and one-half inches results in a fore/aft movement of only about an almost negligible one-eighth inch. Bellcrank 25 is pivotally connected to the seat frame 22 through pivotal connection 38, which is horizontal hole 57 through a distal end of upraised arm 48 of bellcrank 25, the hole with horizontal central axis 39. Bellcrank 25 is pivotally connected though connection 36 to the longitudinal phase-link 35 essentially connecting it to the spring bias pivotal connection 36 including horizontal hole 56 through a distal end of lower arm 50 of bellcrank 25, the hole with horizontal central axis 54. Lower arm 50 is off-set horizontally from the plane of pivotal connections 34 and 39 and is connected to median section 49 by horizontal arm 52. A slot is shown cut laterally across about half the width of arm 48 proximate median section 49 to facilitate bending during some manufacturing processes, but is not necessary nor desirable in most constructions. Angle 51 is between straight line 67 drawn from bellcrank pivot central axis 34 and seat frame connection central axis 39 in the vertical plane of upright arm 48 and straight line 69 drawn in the same vertical plane parallel with straight line 68 drawn from central axis 54 of connection 36 to spring bias in the plane of arm 50 to an extension of central axis 34 is less than ninety degrees. This angle is more preferably in the range of ninety degrees to thirty degrees, and most preferably in the range of 50 to 80 degrees. For bellcranks of the present invention where arm 50 is not offset and all three connections are in one vertical plane, this angle is described as the angle between line 67 from connection pivot central axis 34 to connection seat frame central axis 39 and line 68 from connection pivot central axis 34 to connection spring bias central axis 54. For the purpose of clarity and simplicity, in the specification and in the claims, whether on the non offset or the offset versions of the bellcranks, the said angle is defined by and named by the following language: "an angle between two diverging lines each from a central axis of a pivot connection on the median pivot section of the bellcrank to central axes of pivot connection points on the distal ends of the upper and lower arms". Since the rotation of the bellcrank and the angular movements of the connection points are not affected by the offset, this simpler description of the relative positions of the connection axis includes the versions with the connections in the same plane, that is on a flat piece of metal, as well as the offset version illustrated in FIG. 9. Actually, the bellcranks as illustrated in FIGS. 5 and 6 show the movement of non offset versions and the angle described above. For the sake of brevity the elements and the movement of the balance of the essentially identical bellcranks are not further described although they are illustrated in the balance of the figures. In FIG. 5 seat 17, including foam seat cushion 42 and seat frame 22, is in the full up position with springs 31 and 31' in minimum tension and arms 48 and 48' in full up-right position. As seat 17, including seat frame 22, is depressed in FIG. 6 to an almost full downwardly position, arms 48 and 48' rotate downwardly, springs 31 and 31' are in increased tension providing spring bias, and the upper ends of pivot posts 23 and 23' and median sections 49 and 49' of bellcranks 25 and 25' now extend into cavities 41 and 41' of foam seat cushion 42. It should be observed that the fore/aft position of seat frame 22 is hardly different between FIGS. 5 and 6. A reason for this advantage is that bellcrank 25 moves through almost equal angles from top to mid to bottom positions. Thus, the seat frame positions fore/aft in full upward and full downward positions are essentially identical and only slightly rearward of mid height position. The rotational travel of seat frame connections 38 and 38' are nearly symmetrical above and below the mid height of the seat frame connection. It is preferred that line 68 never rotate more than ninety degrees from the force line of action of the spring bias in its most stretched condition, as a ninety degree angle produces the maximum restoring torque to urge the seat and rider back upwards during the oscillatory travel of the seat. If this angle of line 68 rotates past ninety degrees the restoring torque is lessened and detracts from the rider's comfort. As shown in FIG. 6 the distal ends of arms 50 and 50', pivotal connections 36 and 36' of the bellcrank to the spring bias, and phase link 35 all move downwardly below the upper edges of slide track 46 as the seat frame moves toward its most downward position. As it is important for the phase links and the pivotal connections be as low as possible, the offset of arm 50 inwardly by horizontal offset arm 52 allows the distal ends of arms 50 and 50' and phase links 35 and 35' to move unimpeded between slide tracks 46 and 46' below the height of the slide tracks. These offsets of the bellcrank connection arms allow them to connect to the spring bias means and allow full vertical travel with a higher spring bias throughout the movement with the full bellcrank rotation. In the above embodiment the pairs of slide tracks 45/46 and 45'/46' are about a foot long and about a foot apart and the offset bellcranks are preferred. An embodiment is shown in FIG. 10, a diagram to illustrate the present invention adapted to be used on a mounting deck of a vehicle with no slide tracks to adjust the seat position longitudinally front to back. In this embodiment flat bellcranks of this invention are used. On these vehicles holes are typically provided through the deck on which to bolt the seat apparatus and here the same holes are used that were used to attach the above slide tracks. In this embodiment four spacer mounting pad washers 79 are used to raise frame 21' off the deck about an inch when bolted onto the deck with bolts 47'. The side views of this embodiment are essentially identical to those illustrated in FIGS. 5 and 6 with the diagonal lines showing the off-set removed and the movement, attachment and connection of the various parts are essentially identical. Four vertical pivot cantilever posts 77, essentially identical to the four posts 23, extend upwardly from the outer edges of longitudinal side members 71 and 71' of base frame 21'. Four vertical flat bellcranks 70 pivot in vertical planes on pivot connections at the distal ends of four posts 77. Springs 31' and 31" connect at the front ends to spring connection flange 72, which is essentially identical to flange 60 and operates and is connected to the adjustment mechanism in the same manner as are all of the attachment members and the phase links of this embodiment. Single parts that are essentially identical to the corresponding parts of the first embodiment are marked with a prime (') and are not called out herein. The rear ends of the springs are connected to cross-member spring attachment member 74, which, with its extended length, is attached to longitudinal phase links 76 and 76', which are pivotally connected on both ends on the outside of the bellcrank lower arm pivot connections. Front lateral phase link member 73 is rigidly connected to the lower arms of the front bell cranks 70 and 70". Rear lateral phase link member 75 is rigidly attached to the lower arms of rear bellcranks 70' and 70'''. The distal ends of the upper arms of the four bellcranks 70 are pivotally connected to upper seat frame through four connections 78.

| List of Reference Numbers Emboldened in Text | |
| --- | --- |
| 10 | seat suspension apparatus of this invention |
| 11 | bellcrank of prior art |
| 12 | pivot point |
| 13 | connecting point on seat frame |
| 14 | connecting point on spring bias |
| 15 | angle between lines from pivot to connecting points |
| 16 | seat back, covered foam and frame |
| 17 | seat, covered foam and frame |
| 18 | seat-belt retractor |
| 19 | seat-belt latch |
| 20 | knob for spring tension adjustment |
| 21 | base frame |
| 22 | seat frame |
| 23 | vertical pivot posts (four) |
| 24 | pivot connections (four) |
| 25 | bellcranks (four) |
| 26 | front lateral phase-link |
| 27 | rear lateral phase-link |
| 28 | seat position release lever |
| 29 | seat position release |
| 30 | release pivot connection |
| 31 | tension support springs (two) |
| 32 | threaded spring tension rod |
| 33 | cross-member spring attachment |
| 34 | central axis for pivot connections (four) |
| 35 | longitudinal phase-links (two) |
| 36 | pivotal connections bellcrank to spring bias (four) |
| 37 | shoulder bolts (twelve) |
| 38 | pivotal connections bellcrank to seat frame (four) |
| 39 | central axis for connection 38 |
| 40 | bushings on shoulder bolts to facilitate pivoting |
| 41 | cavities in foam cushion for bellcranks (four) |
| 42 | foam seat cushion |
| 43 | nuts for shoulder bolts (twelve) |
| 44 | bolt connections to vehicle floor deck |
| 45 | lower fore/aft slides (two) |
| 46 | upper fore/aft slides (two) |
| 47 | bolt/nut connection upper slide to base frame |
| 48 | arms of bellcranks connected seat frame (four) |
| 49 | central sections of bellcranks at pivot connections (four) |
| 50 | arms of bellcranks connected to spring bias (four) |
| 51 | angle on bellcranks between lines from pivot point to spring bias and seat frame connection points |
| 52 | bellcrank off-set section |
| 53 | longitudinal side members of frame 21 |
| 54 | central axis of connection 36 |
| 55 | holes through pivot section of bellcranks |
| 56 | holes through spring-bias section of cranks |
| 57 | holes through seat-frame section of cranks |
| 58 | seat frame connection flanges (four) |
| 59 | holes through flanges |
| 60 | spring connection flange |
| 61 | holes through flange for spring connection |
| 62 | holes through cross member for spring connection |
| 63 | hooks on front ends of springs |
| 64 | hooks on rear ends of springs |
| 65 | support for tension rod |
| 66 | horizontal holes in pivot posts |
| 67 | line from central axis 34 to central axis 39 |
| 68 | line from central axis 34 to central axis 54 |
| 69 | line parallel to line 68 through central axis 34 |

| -continued | |
| --- | --- |
| List of Reference Numbers Emboldened in Text | |
| 70 | non off-set bellcranks (four) |
| 71 | longitudinal side members of frame 21' (two) |
| 72 | spring connection flange |
| 73 | front lateral phase-link |
| 74 | cross-member spring attachment |
| 75 | rear lateral phase-link |
| 76 | longitudinal phase-links (two) |
| 77 | vertical pivot posts (four) |
| 78 | connections bellcrank to seat frame (four) |
| 79 | spacer mounting pads (four) |
| b' | fore/aft movement as seat lowers and raises |
| c' | up and down movement of seat |
| α | angle of rotation of bellcrank |
| β | angle of rotation of prior art bellcrank |
| b | fore/aft movement of prior art |
| c | up and down movement of prior art seat |

While this invention has been described with reference to specific embodiments disclosed herein, it is not confined to the details set forth and the patent is intended to include modifications and changes, which may come within and extend from the following claims.

I claim:

1. A seat suspension apparatus adapted to be attached to a mounting deck of a vehicle, said apparatus comprising:
   (A) a lower frame comprising a pair of longitudinal side members,
   (B) four pivot members structurally attached and extending upwardly from the side members of the lower frame,
   (C) four bellcrank members disposed to pivot in vertical planes, each bellcrank member comprising:
      (i) a median pivot section each pivotally connected to a distal end of the four pivot members,
      (ii) an upper bellcrank arm comprising a distal end, and
      (iii) a lower bellcrank arm comprising a distal end,
   (D) an upper seat cushion frame pivotally connected to the distal ends of the four upper bellcrank arms, and
   (E) spring biasing means pivotally connected to the distal ends of the four lower bellcrank arms to provide spring biasing against downward movement of the seat cushion frame,
   wherein, when the upper seat cushion frame is depressed, the median pivot sections of the bellcrank members extend above an upper edge of the upper seat cushion frame and the distal ends of the lower bellcrank arms rotate to a height below a lower edge of the lower frame.

2. The seat suspension apparatus of claim 1 wherein the distal ends of the lower bellcrank arms of the bellcranks are offset laterally inwardly.

3. The seat suspension apparatus of claim 1 wherein the four bellcranks are physically coupled together maintaining them in a phase relationship to each other.

4. The seat suspension apparatus of claim 1 wherein the spring biasing means pivotally connected to distal ends of the lower bellcrank arms comprises a pair of tension springs connected to the upper seat cushion frame.

5. The seat suspension apparatus of claim 1 wherein an angle between two diverging lines each from a central axis of a pivot connection on the median pivot section of the bellcrank to central axes of pivot connection points on the distal ends of the upper and lower arms is in the range of 40 to 70 degrees.

6. The seat suspension apparatus of claim 1 wherein the upper and lower arms of the bellcranks rotate proximate equal angles relative to each other above and below a median position corresponding to median height position of the upper seat cushion frame.

7. The seat suspension apparatus of claim 1 further comprising an adjustment means to adjust the spring bias force.

8. The seat suspension apparatus of claim 7 wherein the spring biasing means comprises a pair of springs each attached at one pair of ends to the distal ends of the lower bellcrank arms and the apparatus further comprises adjustment means comprising connecting a second pair of ends of the springs to a screw shaft extending through an opening in the upper seat cushion frame and terminating in an adjustment knob to turn the shaft to adjust the spring bias.

9. The seat suspension apparatus of claim 1 further comprising a seat cushion attached on top of the seat cushion frame, the cushion comprising a hollowed out space above the frame to receive the median pivot sections of the bellcrank members upon downward movement of the seat cushion frame.

* * * * *